No. 875,265. PATENTED DEC. 31, 1907.
H. J. HOUTSINGER.
ANIMAL TRAP.
APPLICATION FILED FEB. 27, 1907.

Witnesses:
R. J. Jacker
H. H. Overholser

Inventor:
Henry J. Houtsinger,
by Walter N. Haskell,
his Attorney.

UNITED STATES PATENT OFFICE.

HENRY J. HOUTSINGER, OF STERLING, ILLINOIS.

ANIMAL-TRAP.

No. 875,265.  Specification of Letters Patent.  Patented Dec 31, 1907.

Application filed February 27, 1907. Serial No. 359,563.

*To all whom it may concern:*

Be it known that I, HENRY J. HOUTSINGER, a citizen of the United States, residing at Sterling, in the county of Whiteside and State of Illinois, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to animal traps, and relates specially to that class of such devices wherein the animal is caught by a movable wire jaw, actuated by coiled springs. It is frequently a difficult matter to set traps of this description, on account of the tension of the springs and the ease with which the trap may be sprung. Especially in traps of larger size, designed for the capture of larger animals, is the setting of the trap attended with some difficulty and danger of injury to the hands of the operator.

The chief purpose of my device is to provide a simple and novel construction whereby the trap may be set by the foot of the operator. The construction, combination and operation of the parts thereof will be set forth in the following specification and claims.

Figure 1:
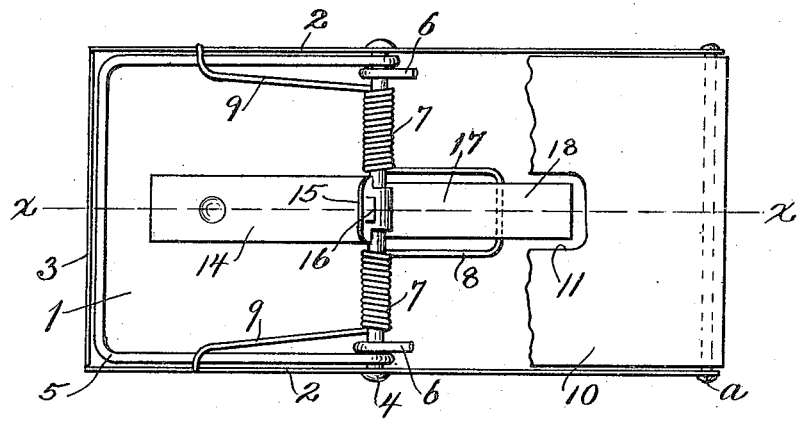
Figure 2:
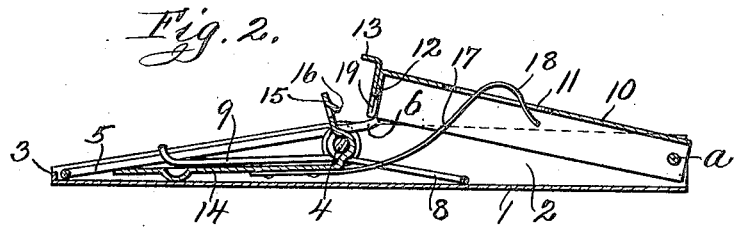
Figure 3:
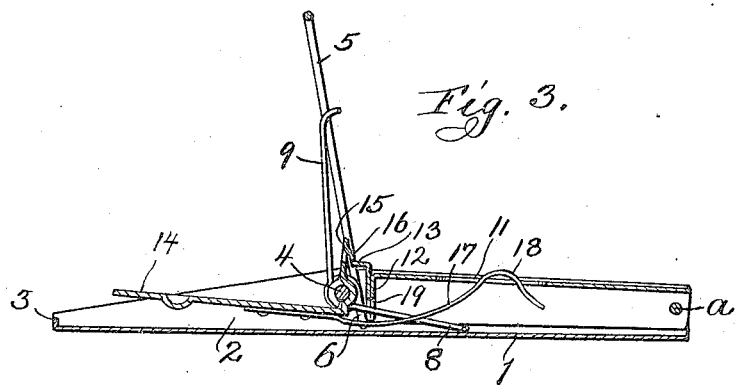

In the drawings: Figure 1 is a plan view of my invention, with a portion of the foot-plate 10 broken away. Fig. 2 is a longitudinal vertical section in the line *x—x* of Fig. 1. Fig. 3 is a similar view, with the trap in position for use.

Similar numbers refer to similar parts throughout the several figures.

1 represents the base-plate of the trap, provided with sides 2 and a raised edge 3 at its front end. Fixed in the sides 2 is a rod 4, upon which is hingeably mounted a wire jaw or loop 5, the ends of which are projected rearwardly into short arms 6. Seated on the rod 4 is a pair of coiled springs 7 7, united by a loop 8, the rear end of which rests upon the base-plate 1. The ends of the springs 7 are projected forwardly into arms 9 9, which engage the side-pieces of the loop 5 to hold the front bar of such loop in contact with the plate 1, as shown in Figs. 1 and 2.

Pivoted in the rear end of the device, as at *a* is a foot-plate 10, provided with a central opening 11. The forward edge of the plate 10 is provided with an angle-plate 12, extending downwardly at approximately a right angle to the plate 10, the lower edge of the plate 12 resting upon the arms 6, when the trap is not set. The front edge of the plate 10 is further provided with a forwardly extending flange 13.

The base-plate 1, and sides thereof, and the foot-plate 10, are preferably constructed of sheet-metal, by which construction the plate 12 and flange 13 can be formed integral with the plate 10 by bending a portion of the metal upon itself to produce the angle-plate and then forwardly to form the flange. This not only lessens the cost of manufacture of these parts, but also gives a greater strength to the plate 12.

Fulcrumed on the rod 4 is a bait-lever 14, having an upwardly projected short arm 15, provided on its rear face with a lug 16. Fixed to the lever 14 is a spring-arm 17, extending rearwardly and upwardly into the opening 11, where it is provided with a bend 18.

To set the trap the lever 14 is provided with suitable bait, and the plate 10 forced downwardly by the foot of the operator, the cross-plate 12 acting upon the arms 6 to throw them into a vertical position, correspondingly elevating the jaw 5, as shown in Fig. 3. As the plate 10 is depressed the arm 17 is also pressed downwardly by the foot of the operator, raising the lever 14, until, when the plate 10 is at its lowest point the lug 16 on the arm 15 engages the edge of the flange 13, locking the plate 10 in its lowered position, and preventing the closing of the jaw 5.

In order that the loop 8 may not interfere with the downward movement of the plate 12, the central portion of such plate may be cut away, forming a recess 19.

Upon the bait-lever being disturbed by the animal it is sought to capture, the lug 16 is disengaged from the flange 13, releasing the plate 10, and permitting the jaw 5, actuated by the springs 7, to close upon the animal.

When the foot is removed from the plate 10, after the trap has been set, the pressure upon the spring-arm 17 is removed, permitting the free end thereof to extend upwardly through the opening 11. This removes the force exerted by such arm upon the lever 14, so that said lever is free to move downwardly when disturbed by the animal, and release the jaw 5.

When the trap is sprung the side members of the jaw 5 conform to the upper edges of the sides 2, and are just within the same, and the cross-bar of such jaw is just in rear of the front edge 3 of the base 1. By this means such edge 3 and sides 2 constitute stationary jaws for the jaw 5 to act against, rendering the operation of the trap more effective.

What I claim as my invention and desire to secure by Letters Patent of the United States, is:

1. An animal trap, comprising a base-plate; a spring-controlled jaw, mounted on such plate, so as to contact therewith, and provided with rearwardly extending arms; a foot-plate, pivoted on said base-plate at one end, and resting on said arms at the opposite end, and adapted to throw such arms into a vertical position to elevate said jaw; means for holding such foot-plate in depressed position; and means for releasing the same by operation of the animal, substantially as set forth.

2. An animal trap, comprising a base-plate; a spring-controlled jaw, mounted on such plate, and adapted to contact therewith; a foot-plate, pivotally supported on said base-plate, and adapted to actuate said jaw, to open the same; a bait-lever, hingeably mounted on said base-plate, and provided with means for locking the same to said foot-plate; means for raising said bait-lever coincidently with the depression of said foot-plate, and means for locking said bait-lever to said foot-plate when it is fully depressed, substantially as and for the purpose mentioned.

3. In a device of the class named, embodying a base-plate and spring-jaw supported thereon; a foot-plate, pivotally supported on said base-plate, provided with a central opening, and adapted to engage said jaw, to open the same; a bait-lever, hingeably mounted on said base-plate, and provided with means for engaging said foot-plate; and a spring-arm, fixed at one end to said bait-lever and extending at the other end into the opening in said foot-plate, substantially as shown and described.

4. In an animal trap, the combination of the base-plate 1; a spring-controlled jaw 5 pivotally supported thereon, and provided with the arms 6; and the foot-plate 10, pivotally supported on the plate 1, and provided with an angle-plate 12, engaging the arms 6 to elevate the jaw 5, substantially as shown and set forth.

5. In an animal trap, the combination of the base-plate 1; a spring-controlled jaw 5 pivotally supported thereon, and provided with arms 6; the foot-plate 10, pivotally supported on the plate 1, such foot-plate being provided with a central opening 11, and engaging the arms 6 to elevate the jaw 5; a bait-lever 14, hingeably mounted on the plate 1, and provided with the spring-arm 17, extending rearwardly into the opening 11; and means for locking the lever 14 to the plate 10 when such plate is fully depressed, substantially as set forth and for the purpose named.

6. In an animal trap, the combination of the base-plate 1, a spring-controlled jaw 5 pivotally mounted thereon, and provided with arms 6; a foot-plate 10, pivotally supported on the plate 1, provided with an opening 11, and adapted to engage the arms 6, to raise the jaw 5; a bait-lever 14 provided with a short arm 15, hingeably mounted on the plate 1, and provided with a spring-arm 17, extending upwardly into the opening 11; a flange 13, on the forward edge of the foot-plate 10; and means for causing the short arm 15 of the bait-lever 14 to engage the flange 13, and lock the arm 15 to the foot-plate 10, substantially as shown and set forth.

7. In an animal trap, the combination of a base-plate 1, provided with the sides 2 and front edge 3; a spring-controlled jaw 5, pivotally mounted on the plate 1, and provided with the arms 6; a foot-plate 10, pivotally supported on the plate 1, and engaging the arms 6 to elevate the jaw 5; a bait-lever 14, hingeably mounted on the plate 1; means for raising the lever 14 simultaneously with the elevation of the jaw 5, and means for locking the lever 14 to the foot-plate 10 when such jaw is fully raised, substantially as shown and described.

In testimony whereof, I affix my signature, in presence of two witnesses.

HENRY J. HOUTSINGER.

Witnesses:
CHAS. H. WOODBURN,
GEORGE H. BEEBE.